United States Patent
Hyman

(10) Patent No.: US 10,372,097 B2
(45) Date of Patent: Aug. 6, 2019

(54) ADAPTIVE ADJUSTMENT OF MOTION SENSITIVITY OF A MOTION SENSOR

(71) Applicant: enLighted, Inc., Sunnyvale, CA (US)

(72) Inventor: Nick Hyman, Los Alto Hills, CA (US)

(73) Assignee: Enlighted, Inc., Sunnyvale, CA (US)

( * ) Notice: Subject to any disclaimer, the term of this patent is extended or adjusted under 35 U.S.C. 154(b) by 425 days.

(21) Appl. No.: 15/197,344

(22) Filed: Jun. 29, 2016

(65) Prior Publication Data
US 2018/0004177 A1    Jan. 4, 2018

(51) Int. Cl.
| | |
|---|---|
| *G05B 11/01* | (2006.01) |
| *G05B 19/042* | (2006.01) |
| *G05B 13/02* | (2006.01) |
| *H05B 37/02* | (2006.01) |

(52) U.S. Cl.
CPC ......... *G05B 19/042* (2013.01); *G05B 13/024* (2013.01); *H05B 37/0227* (2013.01)

(58) Field of Classification Search
CPC . G05B 13/024; G05B 19/042; H05B 37/0227
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,376,925 A * | 12/1994 | Crisafulli | B61L 15/0027 246/167 R |
| 5,812,422 A | 9/1998 | Lyons | |
| 6,057,654 A | 5/2000 | Cousy et al. | |
| 6,084,450 A * | 7/2000 | Smith | H03K 7/08 327/172 |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,437,596 B2 | 10/2008 | McFarland | |
| 7,382,271 B2 | 12/2008 | McFarland | |
| 7,550,931 B2 | 6/2009 | Lys et al. | |
| 7,566,137 B2 | 7/2009 | Veskovic | |
| 7,623,042 B2 | 11/2009 | Huizenga | |
| 7,792,956 B2 | 9/2010 | Choong et al. | |
| 7,925,384 B2 | 4/2011 | Huizenga et al. | |
| 8,538,596 B2 | 9/2013 | Gu et al. | |
| 8,909,382 B1 | 12/2014 | Malakuti | |
| 9,906,722 B1 * | 2/2018 | Gigot | H04N 5/23241 |
| 2004/0002792 A1 | 10/2004 | Hoffknecht | |
| 2005/0169643 A1 | 8/2005 | Franklin et al. | |
| 2005/0278047 A1 | 12/2005 | Ahmed | |

(Continued)

*Primary Examiner* — Jaehwan Oh

(57) ABSTRACT

Apparatuses, methods, apparatuses and systems for adaptively adjusting motion sensitivity of a motion are disclosed. One apparatus includes a motion sensor, wherein the motion sensor generates an output that indicates whether or not motion has been sensed by the motion sensor, wherein the motion sensor receives a motion sensitivity input, wherein the motion sensitivity input controls a level of motion sensitivity of the motion sensor. Further, the motion sensing apparatus includes a controller, wherein the controller generates the motion sensitivity input based at least in part on the output of the motion sensor.

21 Claims, 10 Drawing Sheets

(56) References Cited

U.S. PATENT DOCUMENTS

| | | | |
|---|---|---|---|
| 2006/0197481 A1* | 9/2006 | Hotto | G05B 19/042 318/280 |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0215794 A1 | 9/2007 | Cernasov et al. | |
| 2008/0185597 A1 | 8/2008 | Veskovic et al. | |
| 2008/0244104 A1 | 10/2008 | Clemente | |
| 2008/0265796 A1 | 10/2008 | Null | |
| 2009/0026966 A1 | 1/2009 | Budde et al. | |
| 2009/0179596 A1 | 7/2009 | Willaert et al. | |
| 2009/0195161 A1 | 8/2009 | Lane et al. | |
| 2010/0034386 A1 | 2/2010 | Choong et al. | |
| 2010/0135186 A1 | 6/2010 | Choong et al. | |
| 2010/0141153 A1* | 6/2010 | Recker | H05B 33/0803 315/149 |
| 2010/0264846 A1 | 10/2010 | Chemal et al. | |
| 2010/0270933 A1 | 10/2010 | Chemal et al. | |
| 2010/0295482 A1 | 11/2010 | Chemal et al. | |
| 2010/0301777 A1 | 12/2010 | Chemal et al. | |
| 2011/0031897 A1 | 2/2011 | Henig et al. | |
| 2011/0199010 A1 | 8/2011 | Henig et al. | |
| 2012/0080944 A1* | 4/2012 | Recker | H02J 9/02 307/25 |
| 2013/0293113 A1 | 11/2013 | Morrow | |
| 2014/0125234 A1* | 5/2014 | Sadwick | H05B 37/0218 315/158 |
| 2014/0239817 A1* | 8/2014 | Leinen | H05B 37/02 315/152 |
| 2015/0116205 A1* | 4/2015 | Westerman | G06F 3/016 345/156 |
| 2017/0120802 A1* | 5/2017 | Decaluwe | B60Q 3/16 |
| 2017/0181252 A1* | 6/2017 | Wouhaybi | H05B 37/0245 |
| 2017/0199504 A1* | 7/2017 | Saitou | G05B 19/042 |
| 2017/0238387 A1* | 8/2017 | Dahlen | H05B 33/0854 315/130 |
| 2017/0245347 A1* | 8/2017 | Zhou | H05B 37/0227 |

* cited by examiner

ADAPTIVE ADJUSTMENT OF MOTION SENSITIVITY OF A MOTION SENSOR

FIELD OF THE EMBODIMENTS

The described embodiments relate generally to environmental control systems. More particularly, the described embodiments relate to methods, apparatuses and systems for adaptively adjusting motion sensitivity parameters of a motion sensor of an environmental system.

BACKGROUND

Some lighting systems use the detection of motion to influence lighting of structures associated with the lighting systems. However, if the sensitivity of a lighting system is not optimal, then problems may occur. For example, if the motion sensitivity is too sensitive, the lighting system may illuminate an area when there are no occupants, which is a waste of energy. Conversely, if the motion sensitivity is not sensitive enough, then illumination of the lighting system may turn off while an occupant is present.

It is desirable to have a method, system and apparatus for adaptively adjusting a motion sensitivity of a motion sensor.

SUMMARY

An embodiment includes a motion sensing apparatus. The motion sensing apparatus includes a motion sensor, wherein the motion sensor generates an output that indicates whether or not motion has been sensed by the motion sensor, wherein the motion sensor receives a motion sensitivity input, wherein the motion sensitivity input controls a level of motion sensitivity of the motion sensor. Further, the motion sensing apparatus includes a controller, wherein the controller generates the motion sensitivity input based at least in part on the output of the motion sensor.

Another embodiment includes a method of motion sensing. The method includes generating, by a motion sensor, an output that indicates whether or not motion has been sensed by the motion sensor, wherein the motion sensor receives a motion sensitivity input, wherein the motion sensitivity input controls a level of motion sensitivity of the motion sensor, and generating, by a controller, the motion sensitivity input based at least in part on the output of the motion sensor.

Other aspects and advantages of the described embodiments will become apparent from the following detailed description, taken in conjunction with the accompanying drawings, illustrating by way of example the principles of the described embodiments.

DETAILED DESCRIPTION

Figure 1:
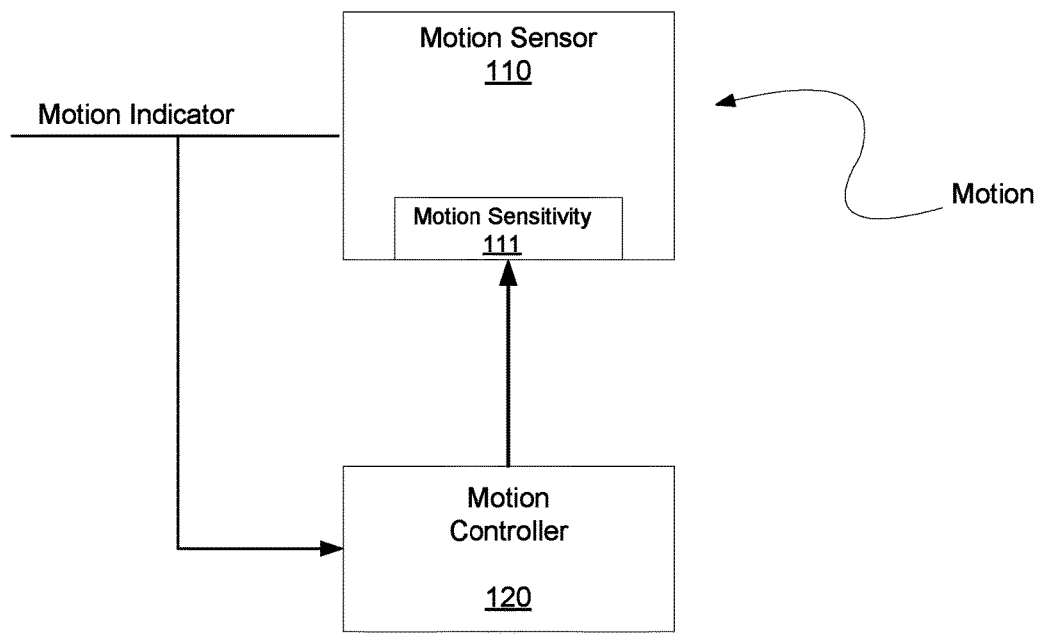
FIG. 1 shows a motion sensor, according to an embodiment.

As shown in the drawings, the described embodiments provide methods, apparatuses, and systems for adjusting a level of motion sensitivity of the motion sensor. For an embodiment, the level of motion sensitivity of the motion sensor is adjusted at least based on an output of the motion sensor. For at least some embodiments, an external occupancy indicator based on at least one of many possible external occupancy or external motion indicators are used to validate the motion sensitivity of the motion sensor. For at least some embodiments, the motion sensor provides control of an environmental parameter of a structure. For an embodiment, the environmental parameter includes lighting control of the structure.

At least some embodiments include tuning (adjusting) the sensitivity of a motion sensor, wherein the motion sensor is operating as an occupancy sensor. As previously stated, if the motion sensor is too sensitive, the motion sensor can misinterpret motion signal variations as occupancy (false motion). If the motion sensor is being used within along with a lighting fixture within a lighting control system, the sensed motion will result in the lighting fixture becoming illuminated. It is typically undesirable to illuminate unoccupied areas due to the associated energy consumption. Conversely, if the motion sensor is not sensitive enough it may not recognize a sedentary occupant. If this occupant goes unnoticed for too long, the lighting fixture may turn off. If the occupant prefers the lights to be on, then the occupant will likely do a 'hand wave' with sufficient motion to trigger the motion (occupancy) sensor. This is undesirable behavior because it negatively affects the lighting experience for the occupant.

Both false motion and hand waving are consequences of an incorrectly set motion sensitivity of the motion sensor. At least some of the described embodiments include methods, apparatuses, and systems of using these events as forcing functions to automatically adjust the motion sensitivity and minimize the likelihood of encountering such events. At least some of the described embodiments are based on identifying these events and taking appropriate action. Hand waves by an occupant can be classified as motion that occurs immediately after a controlled light of a lighting system begins to dim in response to a lack of occupancy. The most likely explanation is that an occupant was dissatisfied with the lights dimming and subsequently produced sufficient motion to re-illuminate the area. For at least some embodiments, false motion can be identified through statistical analysis of a motion signature of the motion sensor in question and comparing it to both other motion sensors in the vicinity of the motion sensor and its motion sensor signature history over time.

FIG. 1 shows a motion sensor 110, according to an embodiment. The motion sensor 110 generates a motion indicator as an output, wherein the motion indicator indicates whether or not the motion sensor 110 has sensed sufficient motion or occupancy. As previously stated, the sensed motion of the motion sensor 110 can be used to control an environmental parameter (such as, lighting and/or heating) of a structure. For this embodiment, a motion controller 120 adaptively sets or adjusts the motion sensitivity 111 of the motion sensor 110. Further, for this embodiment, the motion controller 120 receives (feedback) the motion indicator, and the motion controller 120 adaptively sets or adjusts the motion sensitivity 111 of the motion sensor 110 based at least in part on the motion indicator.

As previously stated, for at least some embodiments, the motion indicator indicates whether the motion sensor 110 senses motion or not. Therefore, the motion controller 120 can adjust the motion sensitivity by determining or estimating whether the motion sensor 110 is correct or not. For an embodiment, both real time and historical values of the motion indicator are utilized to adjust the motion sensitivity.

If the motion sensor is sensing motion over time, and there are external occupancy indicators that indicate no occupancy, then it can be determined that the motion sensitivity is set to be too sensitive. Conversely, if the motion sensor is not sensing motion over time, and there are external occupancy indicators that indicate occupancy, then it can be determined that the motion sensitivity is set to be too low.

Figure 2A:
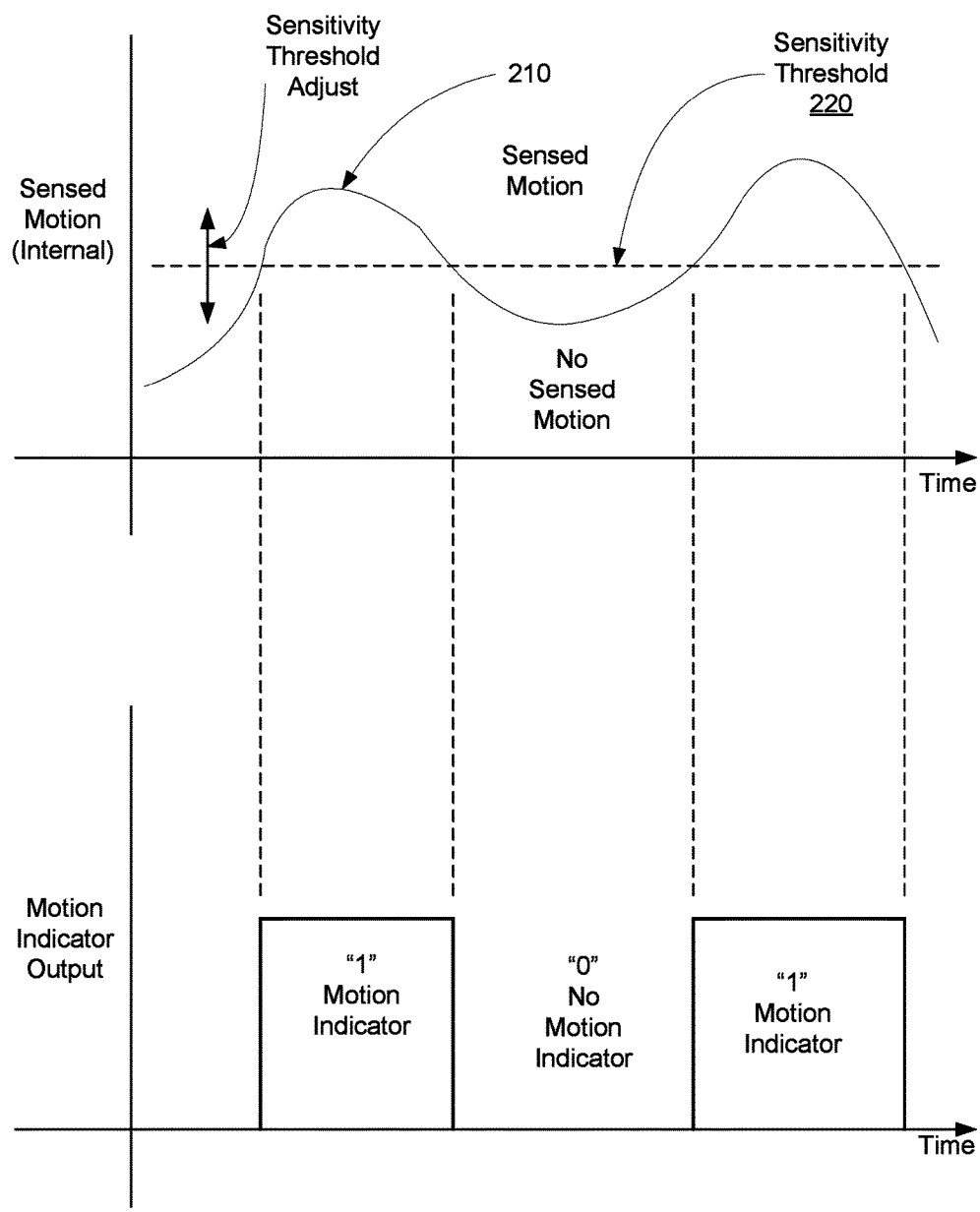
FIG. 2A shows a time line of sensed motion of the motion sensor, according to an embodiment.

FIG. 2A shows a time line of sensed motion of the motion sensor, according to an embodiment. The curve 210 is an analog representation of sensed motion as realized within the motion sensor 110. The analog representation of the curve 210 includes noise and other effects that may not actually be indicators of the type of motion it is desired for the motion sensor 110 to detect. For at least some embodiments, the motion sensor 110 is designed to sense motion of an occupant, and operable to sense occupancy within a structure. As such, only certain levels of sensed motion are to trigger the motion indicator. A motion sensitivity threshold 220 sets the level of sensed motion needed in order for the motion sensor 110 to indicate whether motion is sensed or not. As the sensitivity threshold 220 is increased, the motion sensitivity of the motion sensor 110 decreases (less sensitive). As the sensitivity threshold 220 is decreased, the motion sensitivity of the motion sensor 110 increases (more sensitive).

As previously stated and described, for an embodiment, adjusting the sensitivity of the motion sensor 110 includes adjusting the sensitivity threshold 220. As previously described, for at least some embodiments, the motion sensitivity is controlled or adjusted by the motion controller.

As shown, the motion indicator output indicates motion only when the sensed motion exceeds the sensitivity threshold 220.

Figure 2B:
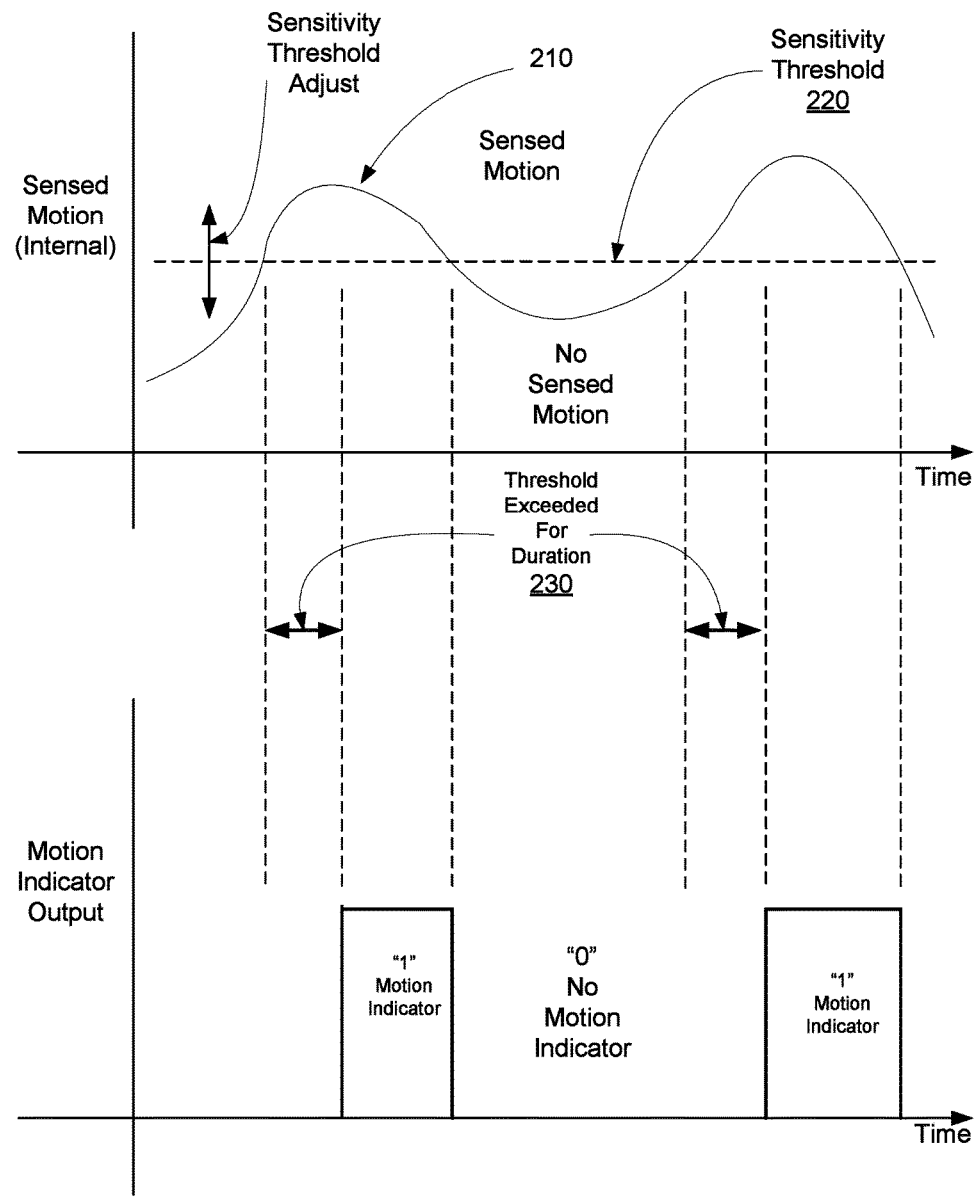
FIG. 2B shows a time line of sensed motion of the motion sensor, according to another embodiment.

FIG. 2B shows a time line of sensed motion of the motion sensor, according to another embodiment. According to this embodiment, the sensed motion must be above the sensitivity threshold 220 for a duration 230 of time before the motion indicator output indicates motion.

For at least some embodiments, the motion sensitivity is controlled or influenced by a plurality of parameters. These parameters include, for example, the sensitivity threshold 220 and/or the duration 230 of time in which the threshold is exceeded as shown in FIG. 2B. More specifically, the output of the motion controller and/or the external occupancy indicators can control the motion sensitivity of the motion sensor by adaptively controlling the threshold 220 and/or the duration 230 of time in which the threshold is exceeded.

Figure 3:
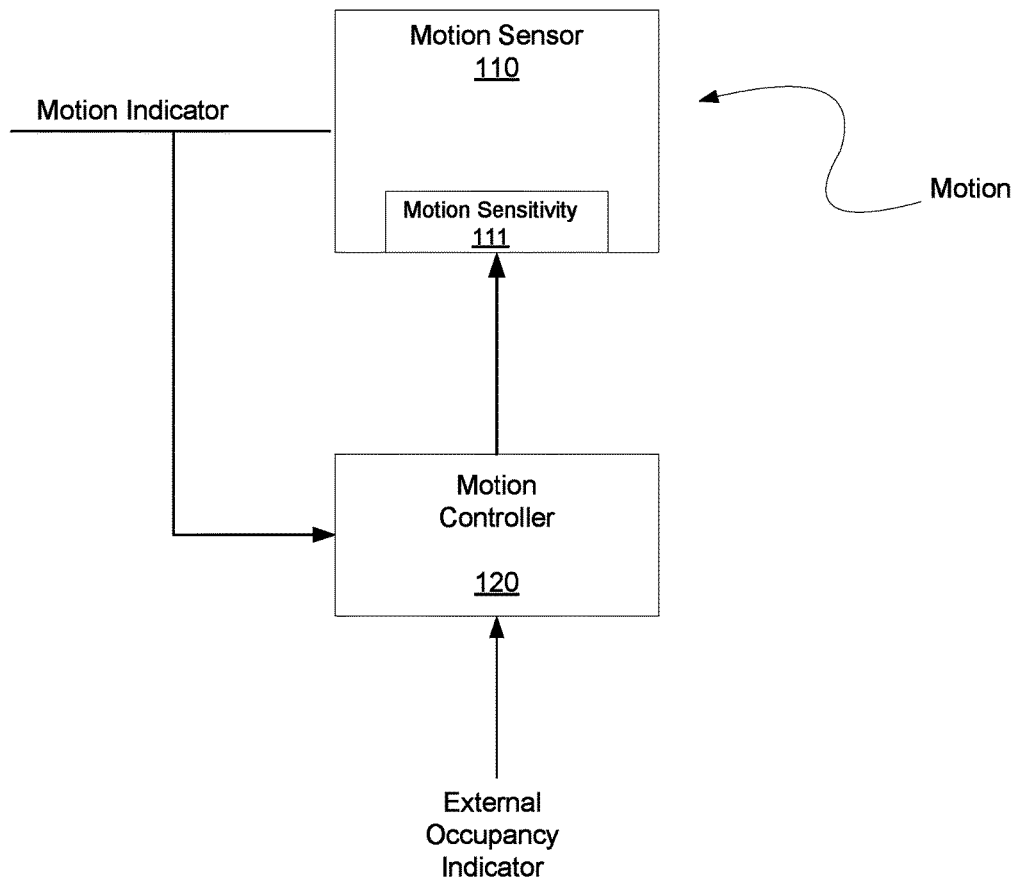
FIG. 3 shows a motion sensor, according to another embodiment.

FIG. 3 shows a motion sensor 110, according to another embodiment. For this embodiment, the motion controller 120 receives the motion indicator and an external occupancy indicator, and the motion controller adaptively sets or adjusts the motion sensitivity 111 of the motion sensor 110 based at least in part on the motion indicator and the external occupancy indicator.

For at least some embodiments, the external occupancy indicator provides an alternate source for determining whether motion or occupancy is present, and therefore, whether the motion sensed by the motion sensor should or should not cause the motion sensor 110 to indicate motion is sensed. Various different embodiments include utilizing information from a variety of different sources for confirming whether or not motion should or should not be indicated as sensed by the motion sensor. These alternate sources include, for example, actions of a user located within or around a structure in which the motion sensor 110 is located. These actions are used to determine whether or not motion is proximate to the motion sensor 110. For example, activation of lighting or other parameters can indicate occupation of the structure, and indicate that motion should be sensed. Other sources include, for example, one or more other motion sensors that are located near or proximate to the motion sensor.

Figure 4:
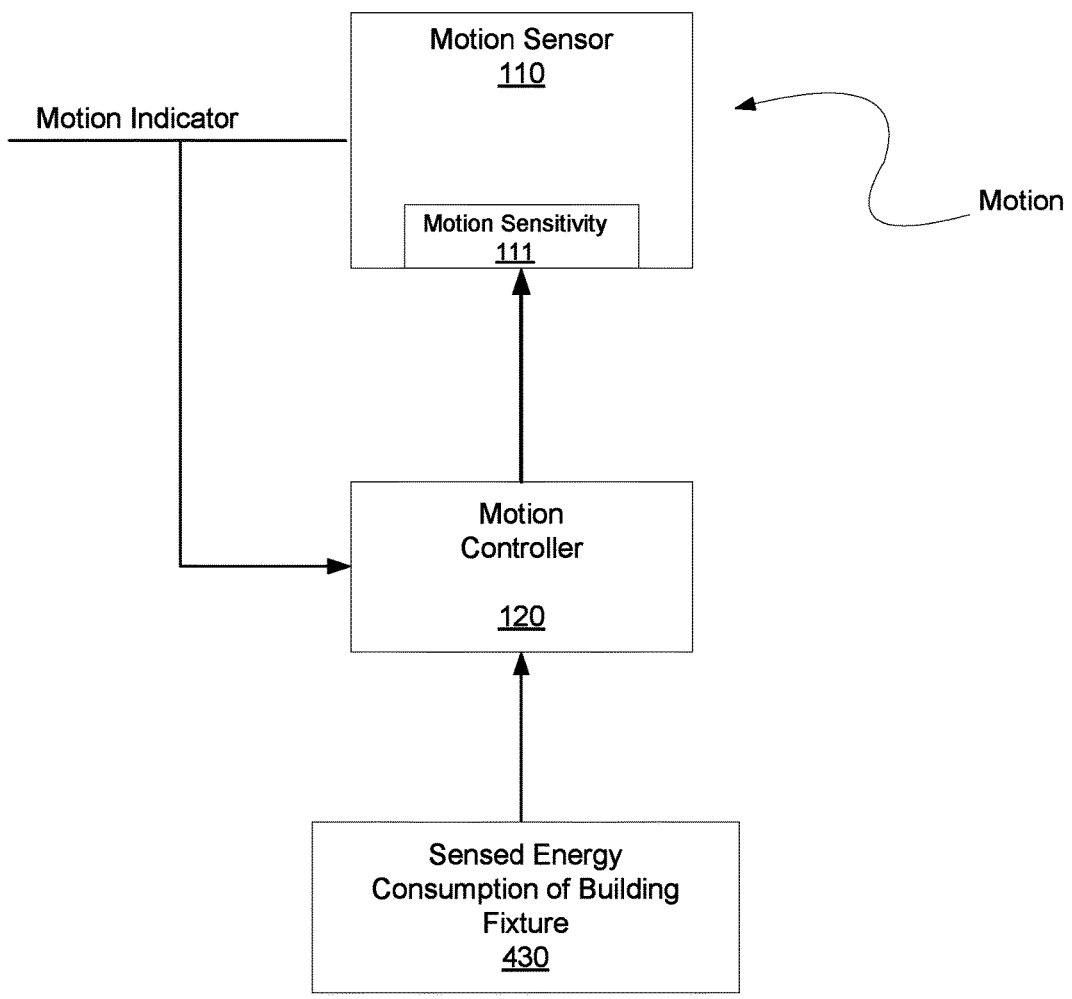
FIG. 4 shows a motion sensor, according to another embodiment.

FIG. 4 shows a motion sensor 110, according to another embodiment. For this embodiment, the external occupancy indicator is provided by a sensing of energy consumption of a building fixture (430). The energy consumption can be used to indicate that a user is proximate to the motion sensor 110, and can therefore, by used to indicate that motion should or should not be indicated by the motion sensor.

Utilizing the sensed energy consumption can be useful because small dips in usage can be identified that indicate a light being turned down or dimming down for a small period of time, and then an occupant can be sensed to hand wave to turn a light back on. Sensing energy consumption rather than sensing light may be better because the light sensing will detect other light as well.

Figure 5:
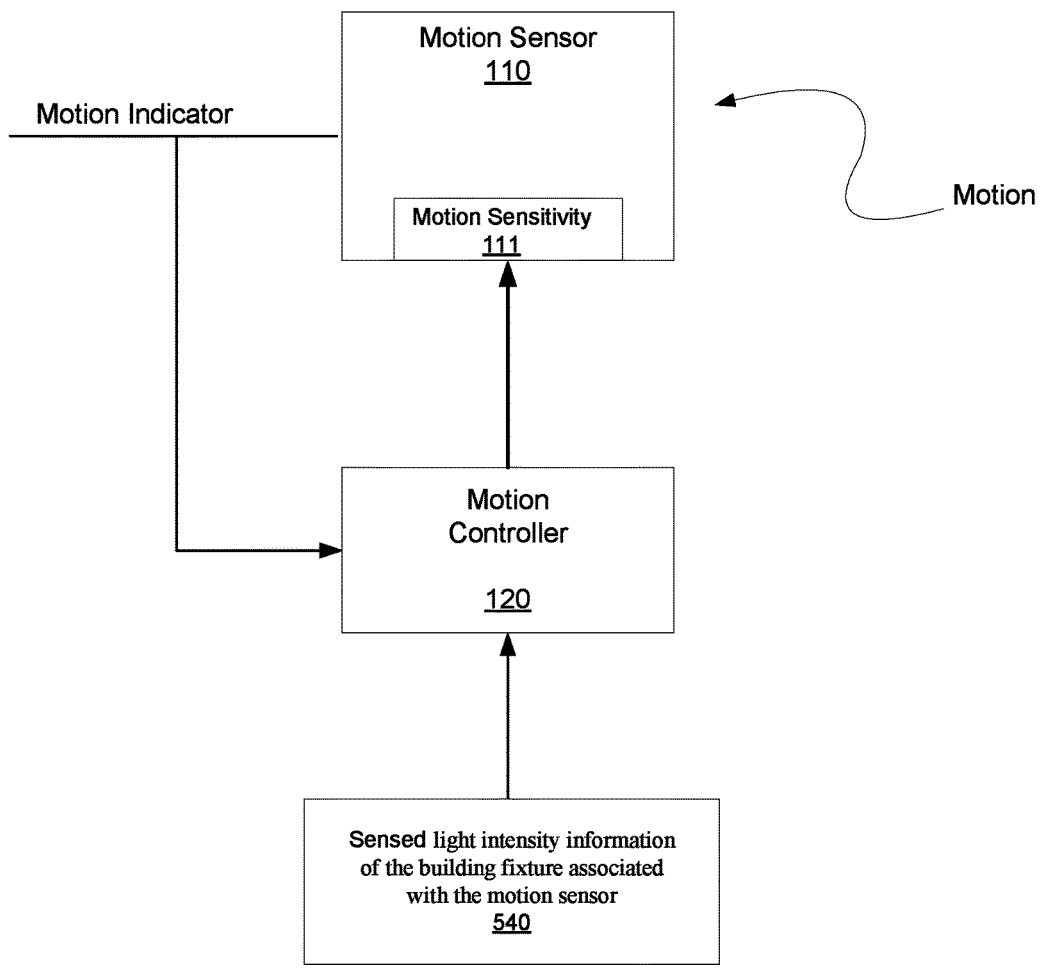
FIG. 5 shows a motion sensor, according to another embodiment.

FIG. 5 shows a motion sensor, according to another embodiment. For this embodiment, the external occupancy indicator is provided by a sensing of lighting of a building fixture (540) associated with motion sensor. Specifically, if lighting proximate to the motion sensor 110 begins to dim and is fully illuminated shortly thereafter, then occupancy can be assumed, which can be used as an indicator that motion should be indicated by the motion sensor 110.

Figure 6:
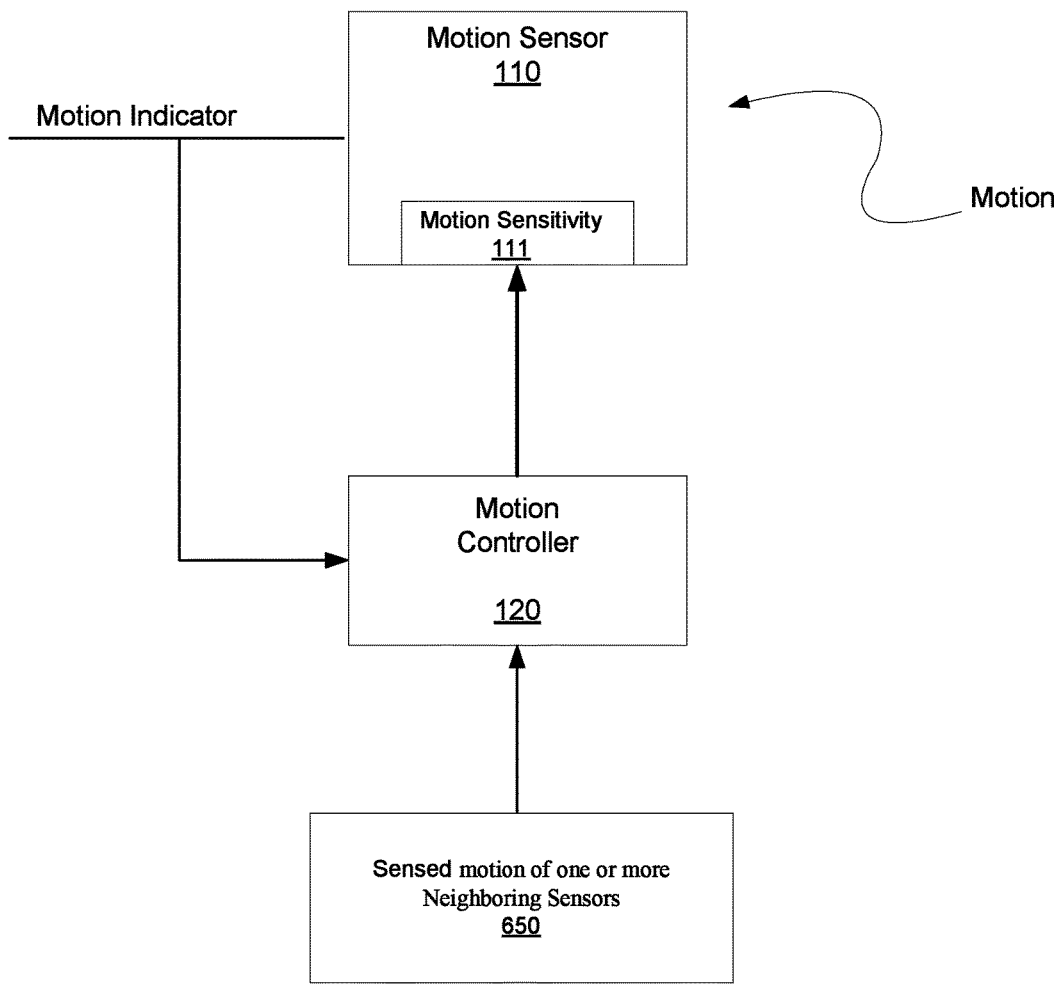
FIG. 6 shows a motion sensor, according to another embodiment.

FIG. 6 shows a motion sensor, according to another embodiment. For this embodiment, the external occupancy indicator is provided by a sensing of motion (motion sensor indicators) by of one or more external occupancy sensors 650. That is, one or more other motion sensors located proximate to the motion sensor 110 are used to confirm or check the accuracy of the motion indicator of the motion sensor 110.

For at least some embodiments, the external occupancy indicator is generated based at least in part on the motion sensor indicators of one or more external occupancy sensors. That is, motion sensing or occupancy sensing of other sensors can be used to confirm whether the motion indicator of the motion sensor is correct or not, and therefore, whether the motion sensitivity of the motion sensor is too sensitive or not sensitive enough.

For at least some embodiments, the external occupancy indicator is generated by receiving and processing a plurality of external occupancy sensor indicators from a plurality of external occupancy sensors. That is, the motion sensing of a plurality of external sensors is used to confirm whether the motion indicator of the motion sensor is correct or not, and therefore, whether the motion sensitivity of the motion sensor is too sensitive or not sensitive enough. In some embodiments, the more proximate the external sensors, the more accurate the external sensor indicator is in validating the motion indicator of the motion sensor.

For at least some embodiments, the external occupancy indicator is generated by a weighting an influence of one or more of the plurality of external occupancy sensor indicators. For at least some embodiments, the weighting is influenced by the proximity of one or more of the plurality of external occupancy sensors. That is, for example, the external sensor that is closest to the motion sensor may be given the greatest weighting. Alternatively or additionally, one or more external sensors may be determined to provide the most accurate indication of whether the motion sensor is actually subject to motion and/or occupancy, and these one or more external motion sensors may provide the greatest weighting. For example, sensors located near an entrance and/or exist to a space within a structure may prove to be the most accurate in occupancy detection, and therefore, be afforded the greatest weighting.

For at least some embodiments, the external occupancy indicator is derived or influenced from sensing the location of an occupant of a structure in which the motion sensor is located. For an embodiment, the sensing of the location of an occupant includes receiving the location information from a mobile device associated with the occupant. This can be derived from a mobile device associated with the occupant. The location can be determined by the mobile device itself, and then provided to the motion sensor controller, which influences the motion sensitivity adjustment. Alternatively, or additionally, a sensor, such as, a Bluetooth sensor may sense the presence and location of the mobile device, and then provide this information to a controller the controls adjustment of the motion sensitivity.

Figure 7:
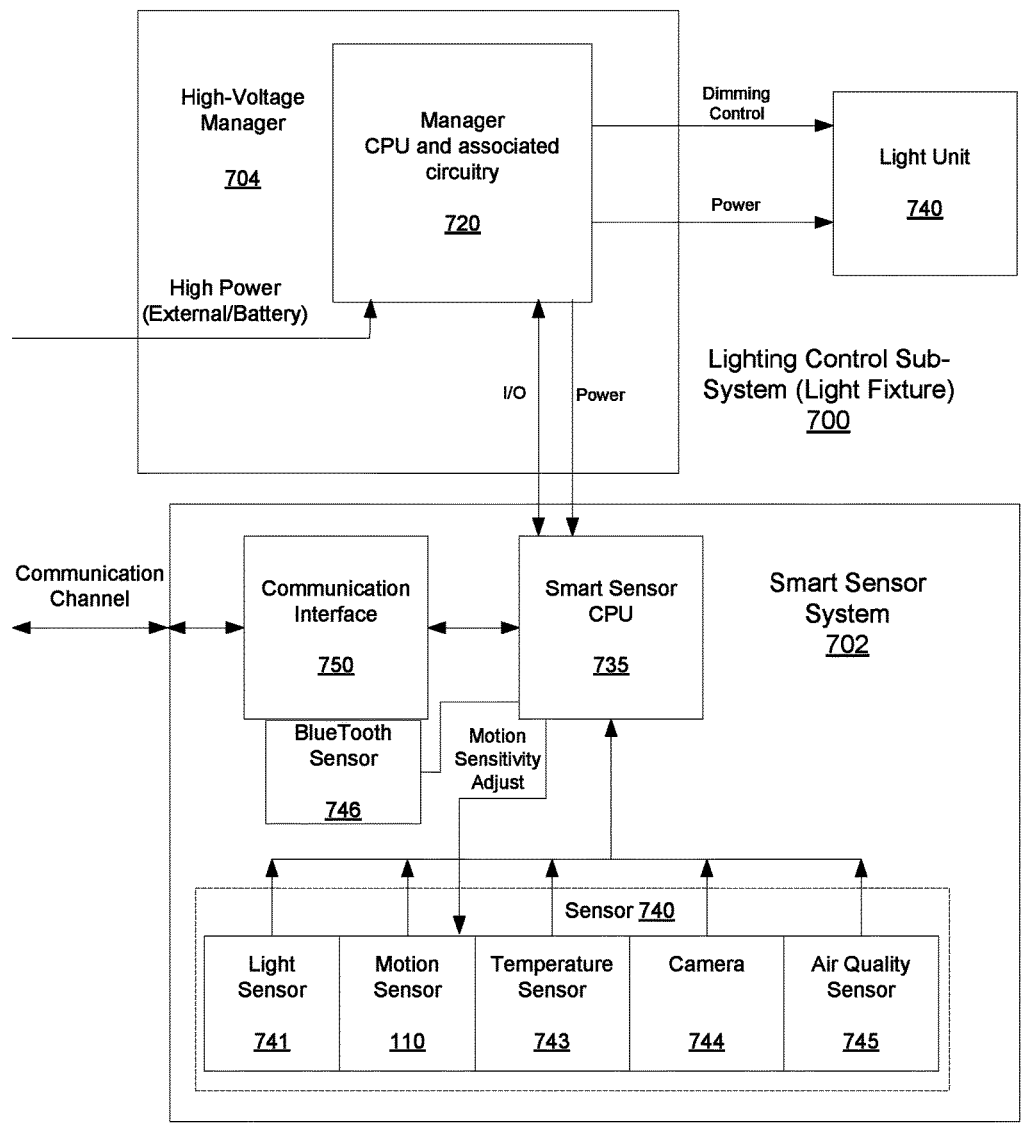
FIG. 7 shows a building fixtures and a motion sensor, according to an embodiment.

FIG. 7 shows a building fixture and a motion sensor, according to an embodiment. For an embodiment, a lighting control system 700 includes the smart sensor system 702 that is interfaced with a high-voltage manager 704, which is interfaced with a luminaire 740. The sensor and associated lighting control of FIG. 7 is one exemplary embodiment of the sensors that includes a motion sensor with an adjustable motion sensitivity. Many different sensor embodiments are adapted for utilization of the described embodiments for sensing and/or tracking motion. For at least some embodiments, sensors (such as, the previously described external sensors) that are not directly associated with light control are utilized.

The motion sensing and/or tracking of the described embodiments can be utilized for optimal control of lighting and other environmental controls of an area or structure that utilizes the motion tracking. The control can be configured to save energy and provide comfort to occupants of the area or structure.

The high-voltage manager 704 includes a controller (manager CPU) 720 that is coupled to the luminaire 740, and to a smart sensor CPU 735 of the smart sensor system 702. As shown, the smart sensor CPU 735 is coupled to a communication interface 750, wherein the communication interface 750 couples the controller to an external device. The smart sensor system 702 additionally includes a sensor 740. As indicated, the sensor 740 can include one or more of a light sensor 741, a motion sensor 742 (which includes the motion sensitivity adjustment), and temperature sensor 743, and camera 744 and/or an air quality sensor 745. It is to be understood that this is not an exhaustive list of sensors. That is additional or alternate sensors can be utilized for occupancy and motion detection of a structure that utilizes the lighting control sub-system 700. The sensor 740 is coupled to the smart sensor CPU 735, and the sensor 740 generates a sensed input. For at least one embodiment, at least one of the sensors is utilized for communication with the user device.

For an embodiment, the smart sensor CPU 735 provides the sensitivity adjustment of the motion sensor 110. For an embodiment, the smart sensor CPU 735 at least aids the sensitivity adjustment of the motion sensor 110. As previously described, for an embodiment, the external occupancy indicator is provided by a sensing of energy consumption of a building fixture, such as, the light fixture 700. As previously described, for an embodiment, the external occupancy indicator is provided by a sensing of lighting of a building fixture, such as, the light fixture 700. For an embodiment, the external occupancy indicator can be at least partially provided by external sensors which are interfaced with the smart sensor CPU 735 through the communication interface 750. For an embodiment, the external occupancy indicator is provided by a sensing a state of status of other available sensors, such as, sensors 741, 743, 744, 745 of the sensor 740. The state of status of the other available sensors 741, 743, 744, 745 can be used to confirm whether or not the motion indicator of the motion sensor 110 is correct, and therefore, whether or not the motion sensitivity of the motion sensor 110 should be adjusted. Further, a Bluetooth sensor 746 can additionally or alternatively be used to sense occupancy, and even the location of the occupant.

As previously described, the external occupancy indicator can be derived from sensing a location of an occupant of a structure in which the motion sensor is located. That is, the location of the occupant can be derived from a mobile device associated with the occupant. For an embodiment, the location of the occupant is received from the mobile device of the occupant. For an embodiment, a sensor, such as the Bluetooth sensor 746 can sense the mobile device and determine the location of the mobile device.

Further, for an embodiment, the camera 744 can be used to sense motion and/or occupancy, and images of the camera 744 can be used to influence the external occupancy indicator.

Further, for an embodiment, the external occupancy detection is influenced by a badging system or other system that monitors entrance and exit of occupants of the structure. For example, sensors may be positioned to sense when doors of an entrance of exit are opened and closed.

For an embodiment, the temperature sensor 743 is utilized for motion tracking. For an embodiment, the temperature sensor 743 is utilized to determine how much and/or how quickly the temperature in the room has increased since the start of, for example, a meeting of occupants. How much the temperate has increased and how quickly the temperature has increased can be correlated with the number of the occupants. All of this is dependent on the dimensions of the room and related to previous occupied periods. For at least some embodiment, estimates and/or knowledge of the number of occupants within a room are used to adjust the HVAC (heating, ventilation and air conditioning) of the room. For an embodiment, the temperature of the room is adjusted based on the estimated number of occupants in the room.

According to at least some embodiments, the controllers (manager CPU 720 and the smart sensor CPU) are operative to control a light output of the luminaire 740 based at least in part on the sensed input, and communicate at least one of state or sensed information to the external device.

For at least some embodiments, the high-voltage manager 704 receives the high-power voltage and generates power control for the luminaire 740, and generates a low-voltage supply for the smart sensor system 702. As suggested, the high-voltage manager 704 and the smart sensor system 702 interact to control a light output of the luminaire 740 based at least in part on the sensed input, and communicate at least one of state or sensed information to the external device. The high-voltage manager 704 and the smart sensor system 702 can also receive state or control information from the external device, which can influence the control of the light output of the luminaire 740. While the manager CPU 720 of the high-voltage manager 704 and the smart sensor CPU 735 of the smart sensor system 702 are shown as separate controllers, it is to be understood that for at least some embodiments the two separate controllers (CPUs) 720, 735 can be implemented as single controller or CPU.

For at least some embodiments, the communication interface 750 provides a wireless link to external devices (for example, the central controller, the user device and/or other lighting sub-systems or devices, and external sensors).

An embodiment of the high-voltage manager 704 of the lighting control sub-system 700 further includes an energy meter (also referred to as a power monitoring unit), which receives the electrical power of the lighting control sub-system 700. The energy meter measures and monitors the power being dissipated by the lighting control sub-system 700. For at least some embodiments, the monitoring of the dissipated power provides for precise monitoring of the dissipated power. Therefore, if the manager CPU 720 receives a demand response (typically, a request from a power company that is received during periods of high power demands) from, for example, a power company, the manager CPU 720 can determine how well the lighting control sub-system 700 is responding to the received demand response. Additionally, or alternatively, the manager CPU 720 can provide indications of how much energy (power) is being used, or saved.

Figure 8:
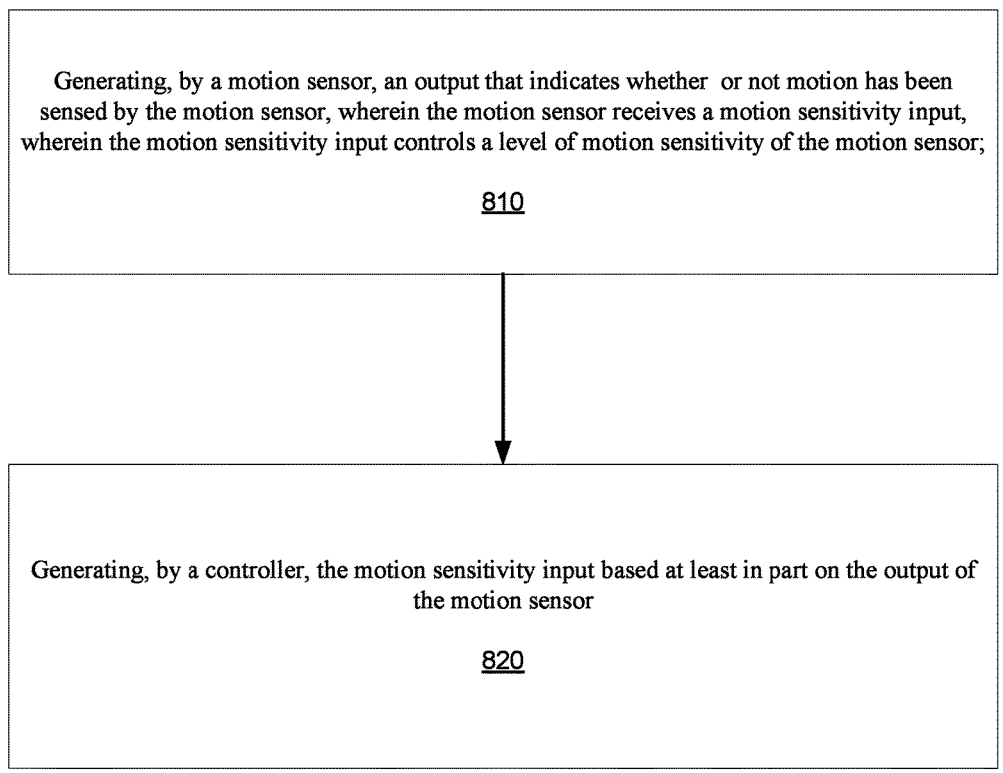
FIG. 8 is a flow chart that includes steps of a method of motion sensing, according to another embodiment.

FIG. 8 is a flow chart that includes steps of a method of motion sensing, according to another embodiment. A first step 810 includes generating, by a motion sensor, an output that indicates whether or not motion has been sensed by the motion sensor, wherein the motion sensor receives a motion sensitivity input, wherein the motion sensitivity input controls a level of motion sensitivity of the motion sensor. A second step 820 includes generating, by a controller, the motion sensitivity input based at least in part on the output of the motion sensor.

As previously described, for an embodiment, the controller generates the motion sensitivity input based at least in part on the output of the motion sensor over time. As previously described, for an embodiment, the controller generates the motion sensitivity input based at least in part on the output of the motion sensor and an external occupancy indicator that indicates a sensed occupancy of an area associated with the motion sensing apparatus. As previously described, for an embodiment, the external occupancy indicator is generated based on sensing a behavior of a building fixture associated with the motion sensing apparatus.

As previously described, for an embodiment, the external occupancy indicator is generated based on motion sensor indicators of one or more external occupancy sensors. As previously described, for an embodiment, the external occupancy indicator is generated based at least in part on the on motion sensor indicators of one or more external occupancy sensors over time. As previously described, for an embodiment, the external occupancy indicator is generated by receiving and processing a plurality of external occupancy sensor indicators from a plurality of external occupancy sensors. As previously described, for an embodiment, the external occupancy indicator is generated by a weighting an influence of one or more of the plurality of external occupancy sensor indicators. As previously described, for an embodiment, the weighting is influenced by a proximity of one or more of the plurality of external occupancy sensors.

Figure 9:
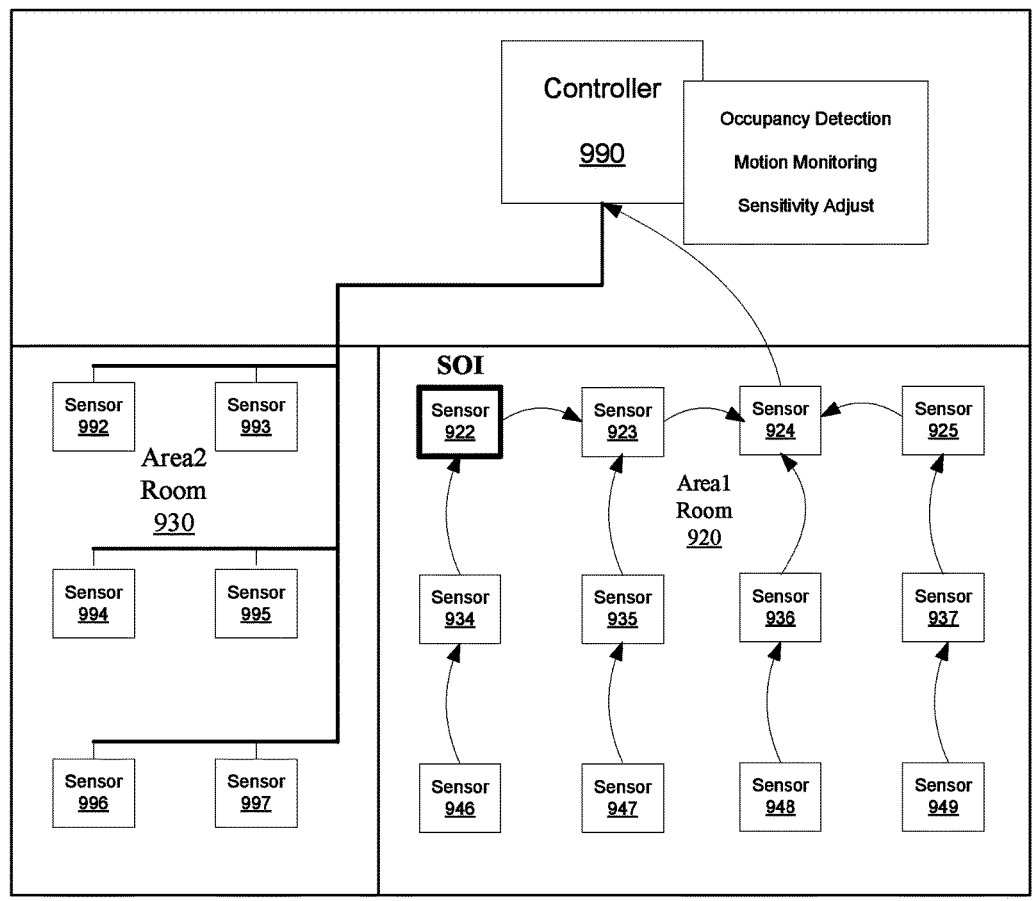
FIG. 9 shows a structure that includes multiple motion sensors for controlling an environmental parameter of the structure, according to an embodiment.

FIG. 9 shows a structure that includes multiple motion sensors for controlling an environmental parameter of the structure, according to an embodiment. As shown, a sensor 922 is designated as a sensor of interest (SOI). For an embodiment, the motion sensitivity of this motion sensor 922 is adjusted based on an external occupancy indicator, wherein the external occupancy indicator is generated at least in part based on sensing of other sensors 923, 924, 925, 934, 935, 936, 937, 946, 947, 948, 949, 992, 993, 994, 995, 996, 997, wherein at least some of the other sensors are motion sensors.

As shown, a structure includes a first area 920 and a second area 930. Further, a controller 990 is shown which can be an external controller that performs the processing, or can be multiple controllers associated with the sensors which distribute the processing, or a combination of both.

For an embodiment, statistical analysis is performed by the processing of sensed outputs of one or more of the other sensors to generate the external occupancy indicator, which as previously described, is used to generate the motion sensitivity adjustment of the SOI 922.

For an embodiment, the sensors closest to the SOI 922 have the greatest influence on the motion sensitivity adjustment of the SOI 922. However, that does not always have to be the case. For example, the SOI 922 may be located next to a doorway of the first area 920 and a sensor (such as, sensor 993) may be located next to the same doorway, but with the second area 990. Accordingly, the sensor 993 may not be the most proximate sensor, but may be a strong indicator of motion detection as an occupant passes through the doorway between the second area 990 and the first area 920.

Further, as previously described, the activation of lighting or the use of energy within the area 920 of the SOI 922 can also be used for occupancy and/or motion detection which can be used to confirm motion sensing of the SOI 922.

For a statistical analysis, set of sensors proximate or related to a sensor of interest (SOI) can be represented by S={S1, S2, S3, . . . }, wherein each sensor has a specific location (for example, (x,y)). For an embodiment, the SOI is a sensor that includes the adjustable motion sensitivity.

Further a distance function d(S1, S2) that represents the distance between each of the set of sensors and the sensor of interest can be represented by:

$$d(S1,S2)=((x1-x2)^2+(y1-y2)^2)^{1/2}, \text{ wherein } S1 \text{ is a first sensor (for example, the SOI) and } S2 \text{ is a second sensor.}$$

For each moment in time (T), each sensor Si generates an indicator of whether it senses motion greater than the sensitivity threshold, given by Si(T)=0 (motion sensed less than the threshold) or Si(T)=1 (motion sensed greater than the threshold).

For at least some embodiments, each sensor Si is given a weighting which represents the sensors relationship or correlation with the SOI. That is, how reliable the indicator from the sensor Si is in predicting the proper indicator of the SOI. For an embodiment, the reliability weight is given by 0<=r(Si)<=1.

For an embodiment, an EOI (SOI(T)) (external occupancy indicator for the sensor of interest at time T) can be estimated or determined using the Si(T) (sensed state of sensor Si), the r(Si) (the weighting reliability of Si), and the d(SOI, Si) (distance between the SOI and Si).

For simplicity of representation, let d(Si)=d(SOI, Si), and let E(T)=EOI (SOI(T)).

For an embodiment, a radial basis function (RBF) is used to adjust how the proximity of the sensors that neighbor the SOI influences the calculation of the EOI, wherein:

RBF(distance)=(1/distance) or (1/(distance)$^2$), or . . .

For an embodiment, the RBF provides weighting to neighboring sensors based on a distance between the neighboring sensor and the SOI.

For an embodiment, a general weighting function W(Si) is given as:

$W(Si)=r(Si)*RBF(d(Si))$; and $EOI(Si)=(\Sigma Si(T)*W(Si))/(\Sigma W(Si))$ wherein $i=0$ to $n$;

which provides a weighted average of the neighboring sensors on the external occupancy indicator at time T.

Although specific embodiments have been described and illustrated, the described embodiments are not to be limited to the specific forms or arrangements of parts so described and illustrated. The embodiments are limited only by the appended claims.

What is claimed:

1. A motion sensing apparatus, comprising:
   a motion sensor, wherein the motion sensor generates an output that indicates whether or not motion has been sensed by the motion sensor, wherein the motion sensor receives a motion sensitivity input, wherein the motion sensitivity input controls a level of motion sensitivity of the motion sensor; and
   a controller, wherein the controller generates the motion sensitivity input based at least in part on the output of the motion sensor.

2. The apparatus of claim 1, wherein the controller generates the motion sensitivity input based at least in part on the output of the motion sensor over time.

3. The apparatus of claim 2, wherein the controller generates the motion sensitivity input based at least in part on the output of the motion sensor over time intervals.

4. The apparatus of claim 1, wherein the controller generates the motion sensitivity input based at least in part on the output of the motion sensor and an external occupancy indicator that indicates a sensed occupancy of an area associated with the motion sensing apparatus.

5. The apparatus of claim 4, wherein the external occupancy indicator is generated based on sensing a behavior of a building fixture associated with the motion sensing apparatus.

6. The apparatus of claim 5, wherein the external occupancy indicator is generated based on sensing energy consumption information of the building fixture associated with the motion sensing apparatus.

7. The apparatus of claim 5, wherein the external occupancy indicator is generated based on sensing light intensity information of the building fixture associated with the motion sensing apparatus.

8. The apparatus of claim 4, wherein the external occupancy indicator is generated based on motion sensor indicators of one or more external occupancy sensors.

9. The apparatus of claim 8, wherein the external occupancy indicator is generated based at least in part on the on motion sensor indicators of one or more external occupancy sensors over time.

10. The apparatus of claim 8, wherein the external occupancy indicator is generated by receiving and processing a plurality of external occupancy sensor indicators from a plurality of external occupancy sensors.

11. The apparatus of claim 10, the external occupancy indicator is generated by a weighting an influence of one or more of the plurality of external occupancy sensor indicators.

12. The apparatus of claim 11, wherein the weighting is influenced by a proximity of one or more of the plurality of external occupancy sensors.

13. A method of motion sensing, comprising
   generating, by a motion sensor, an output that indicates whether or not motion has been sensed by the motion sensor, wherein the motion sensor receives a motion sensitivity input, wherein the motion sensitivity input controls a level of motion sensitivity of the motion sensor; and
   generating, by a controller, the motion sensitivity input based at least in part on the output of the motion sensor.

14. The method of claim 13, wherein the controller generates the motion sensitivity input based at least in part on the output of the motion sensor over time.

15. The method of claim 13, wherein the controller generates the motion sensitivity input based at least in part on the output of the motion sensor and an external occupancy indicator that indicates a sensed occupancy of an area associated with the motion sensing apparatus.

16. The method of claim 13, wherein the external occupancy indicator is generated based on sensing a behavior of a building fixture associated with the motion sensing apparatus.

17. The method of claim 13, wherein the external occupancy indicator is generated based on motion sensor indicators of one or more external occupancy sensors.

18. The method of claim 17, wherein the external occupancy indicator is generated based at least in part on the motion sensor indicators of one or more external occupancy sensors over time.

19. The method of claim 17, wherein the external occupancy indicator is generated by receiving and processing a plurality of external occupancy sensor indicators from a plurality of external occupancy sensors.

20. The method of claim 17, wherein the external occupancy indicator is generated by a weighting an influence of one or more of the plurality of external occupancy sensor indicators.

21. The method of claim 17, wherein the weighting is influenced by a proximity of one or more of the plurality of external occupancy sensors.

* * * * *